April 3, 1928.

W. H. ROBERTSON

CASH REGISTER

Filed May 1, 1926

Inventor
William H. Robertson
By
His Attorneys

April 3, 1928.
W. H. ROBERTSON
CASH REGISTER
Filed May 1, 1926
1,664,946
7 Sheets-Sheet 3
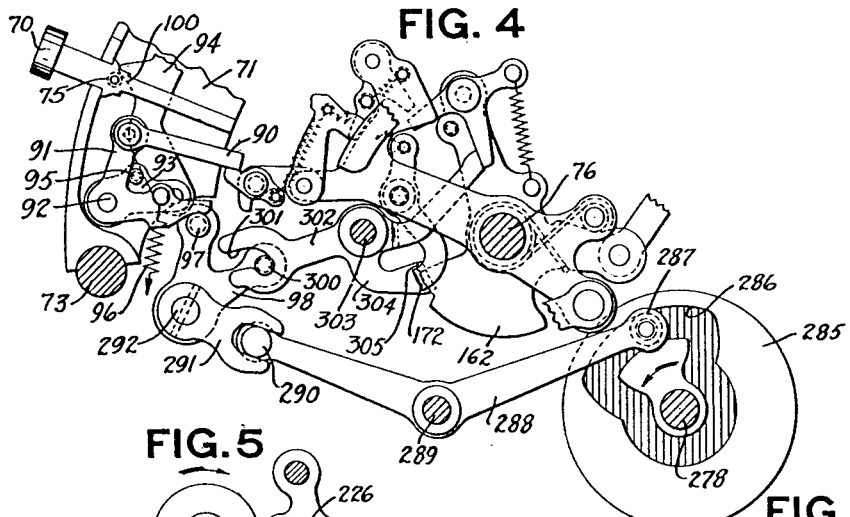
FIG. 4
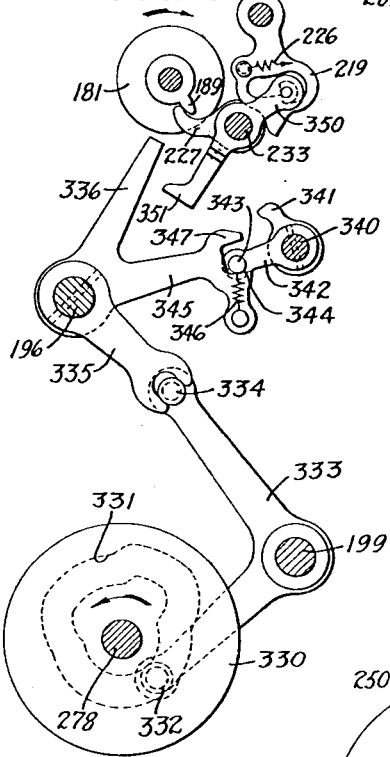
FIG. 5
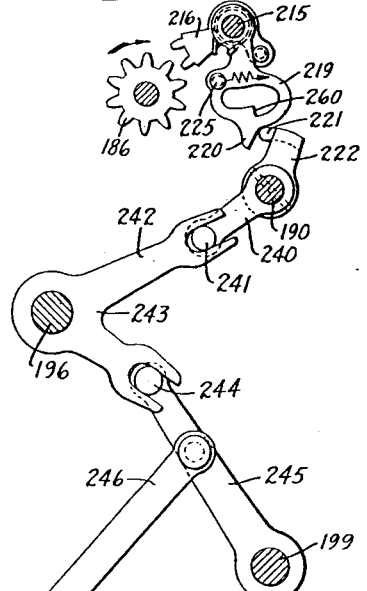
FIG. 6
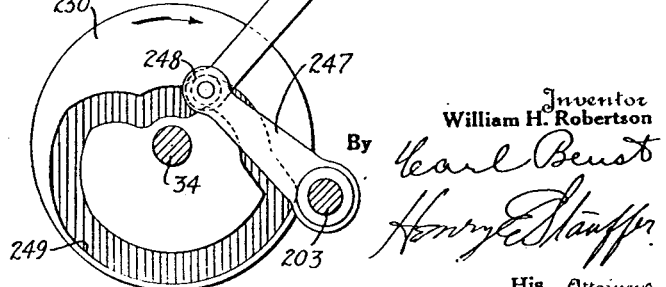
Inventor
William H. Robertson
By Carl Beust
Henry E. Stauffer
His Attorneys April 3, 1928.
W. H. ROBERTSON
CASH REGISTER
Filed May 1, 1926
1,664,946
7 Sheets-Sheet 4
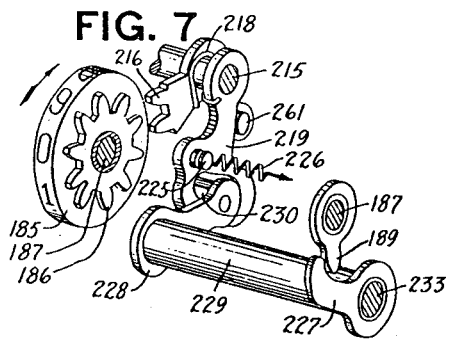
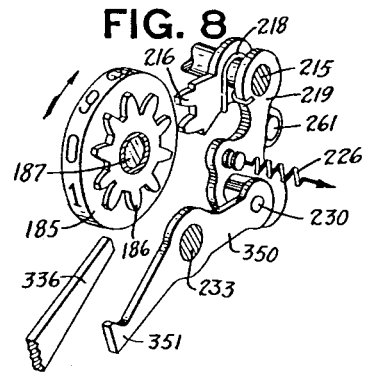
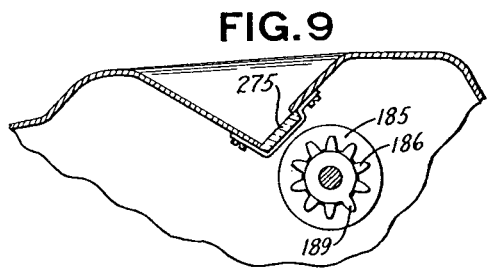
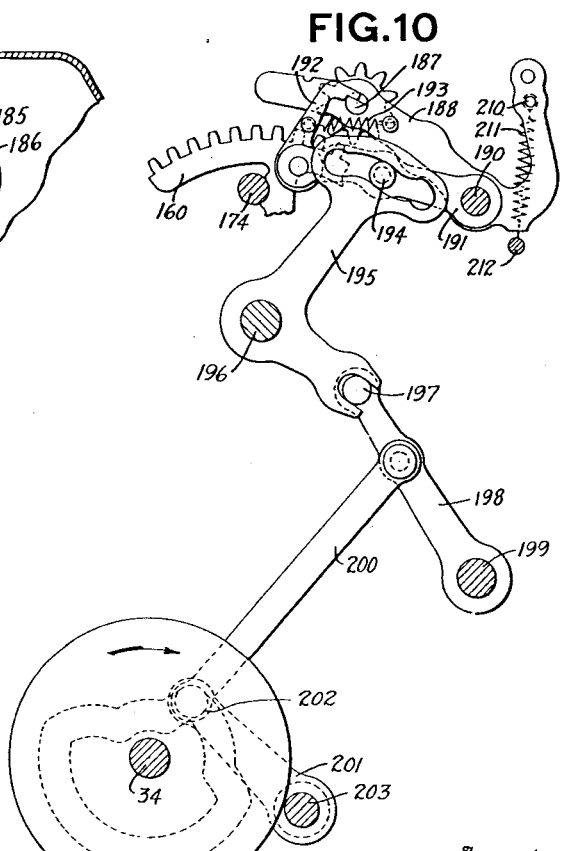
Inventor
William H. Robertson
By Pearl Beust
Henry E. Stauffer
His Attorneys April 3, 1928.    W. H. ROBERTSON    1,664,946
CASH REGISTER
Filed May 1, 1926    7 Sheets-Sheet 5

Inventor
William H. Robertson
By Earl Beust
Henry E Stauffer
His Attorneys

April 3, 1928.

W. H. ROBERTSON 1,664,946

CASH REGISTER

Filed May 1, 1926 7 Sheets-Sheet 6

Inventor
William H. Robertson
By Carl Beust
Henry E. Stauffer
His Attorneys

April 3, 1928.  W. H. ROBERTSON  1,664,946
CASH REGISTER
Filed May 1, 1926   7 Sheets-Sheet 7

Inventor
William H. Robertson
By Pearl Beust
Henry E. Stauffer
His Attorneys

Patented Apr. 3, 1928.

1,664,946

UNITED STATES PATENT OFFICE.

WILLIAM H. ROBERTSON, OF DAYTON, OHIO, ASSIGNOR TO THE NATIONAL CASH REGISTER COMPANY, OF DAYTON, OHIO, A CORPORATION OF MARYLAND.

CASH REGISTER.

Application filed May 1, 1926. Serial No. 106,016.

This invention relates to cash registers and the like, and more particularly to machines of the type shown and described in Letters Patent of the United States, No. 1,230,864, issued to W. A. Chryst on June 26, 1917 and Letters Patent No. 1,619,796, issued to Bernis M. Shipley, on March 1, 1927.

The principal object of this invention is to provide a totalizer for ledger numbering devices for the purpose of providing a check for determining whether a plurality of transactions were properly posted.

Another object is to provide an improved differential mechanism.

A further object is to provide a simplified mechanism for taking totals, in which the time of engaging and disengaging the totalizer from the actuators is the same during adding operations as during total taking operations.

With these and incidental objects in view the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 4 is a detail view of the differential mechanism together with the cam for controlling the differential for total taking operations.

Fig. 5 is a detail view of the mechanism for controlling the movement of the actuators during total taking operations.

Fig. 6 is a detail view of the transfer operating mechanism.

Fig. 7 is a detail view in perspective showing one unit of the transfer mechanism.

Fig. 8 is a detail view in perspective of the mechanism for causing one to be added into the units totalizer wheel after all of the totalizer wheels have been set to nine during total taking operations.

Fig. 9 is a detail view showing the sight opening for reading the totalizer.

Fig. 10 is a detail view of the operating mechanism for engaging and disengaging the totalizer with and from the actuators.

In general.

In the present application only one bank of keys is disclosed. However, any number of banks may be used. The construction and operation of the keys in the banks are identical with those shown and described in the above mentioned Shipley Patent, No. 1,619,796. They are adapted to control the differential for adding amounts into a ledger number totalizer commensurate with the value of the ledger number keys depressed. These keys are used for the purpose of setting up ledger or account numbers at the time the transactions are entered into the main totalizer of the machine. This ledger number totalizer is provided in order to afford a check at the end of the day for determining whether or not the proper account numbers have been set up. At the end of the day all of the cards upon which the amounts have been entered are gone over and all of the ledger or account numbers again entered into the ledger number totalizer. If this total checks with the total at the end of the day's business, it is an indication that all of the ledger numbers during the day have been properly set up and recorded.

The differential herein disclosed is of a novel construction in that it is made up of two members which operate as a unit for adding amounts into the totalizer, but which are adapted to operate independently of each other during total taking operations.

The mechanism herein disclosed is so constructed that an amount can be set up on the keyboard during each operation, but the adding of any amount into the totalizer is not finished until the next operation. During the operation in which an amount has been set up on the keyboard, the actuators and type wheels are adjusted commensurate with the keys depressed. At the beginning of the next operation of the machine the totalizer is engaged with the actuators and the amount which was set up thereon during the previous operation, will be entered into the totalizer.

The totalizer is provided with wheels which can be read visibly, without the necessity of performing a total taking operation. However, before a correct total can be read from these wheels it is necessary to perform an idle adding operation in order to complete the total.

In the machine herein disclosed a simplified total taking mechanism is used, inasmuch as the engaging and disengaging of the totalizers occur at the same time during total taking operations as during adding operations. However, certain mechanisms must be rendered operative during total taking operations which do not operate during adding operations. These mechanisms are under control of a total lever of the usual type.

*Operating mechanism.*

Figure 12:
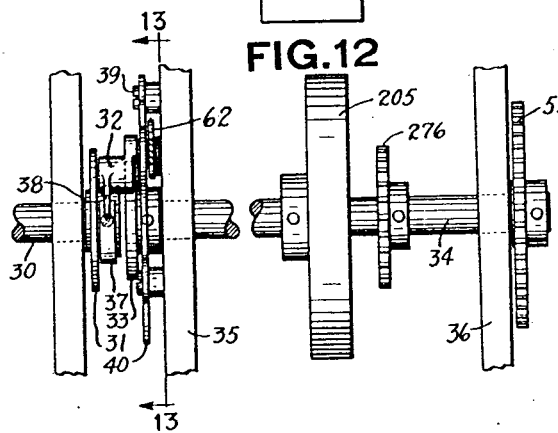
Fig. 12 is a fragmentary portion in front elevation of the main operating shafts.
Figure 13:
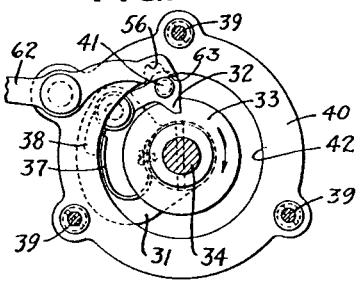
Fig. 13 is a detail view of a mechanism for clutching the main operating shaft of the machine to the main operating shaft of the ledger numbering device and is taken on line 13—13 of Fig. 12.

The attachment herein disclosed may be operated either simultaneously with the main machine, or it may be operated independently thereof. A clutch mechanism has been provided which will automatically either clutch the operating shafts of the two machines together or permit independent rotation of the operating shaft of the ledger number attachment in the following manner. The main operating shaft 30 (Fig. 12) of the main machine has secured thereto an arm 31 (see also Fig. 13) which has pivoted thereto a pawl 32 adapted to normally engage a notch cut in the periphery of a disk 33. The disk 33 is secured to the main operating shaft 34 carried by the frames 35 and 36 of the ledger number attachment. A flat spring 37 secured to the hub of the arm 31, bears against a tail 38 of the pawl 32 and holds the pawl in engagement with the disk 33. When the shaft 30 is rotated in the direction of the arrow (Fig. 13), the shaft 34 will be rotated therewith by means of the pawl 32.

The following means is provided for preventing the pawl 32 from becoming disengaged from the notch in the disk 33 after the main machine has started to operate. Secured to the frame 35 by means of three screws 39 (Figs. 12 and 13), is a plate 40 which lies in the plane of a stud 41 carried by the pawl 32. The plate 40 is provided with an opening 42 in which the stud 41 is adapted to rotate. The space between the periphery of the disk 33 and the inner wall of the plate 40 is such as to limit the movement of the pawl 32 and thereby prevent it from becoming disengaged from the notch in the disk.

An operating handle 50 (Fig. 11) is provided for rotating the operating shaft 34 of the ledger number attachment independently of the main machine. The handle 50 is secured to a shaft 51 to which is also secured a gear 52 meshing with a gear 53 loosely mounted on a stud 54 carried by the side frame 36. The gear 53 meshes with a gear 55 secured to the operating shaft 34. When operating the handle 50 is turned, the cam shaft 34 will be rotated in a clockwise direction, thereby rotating the disk 33. The pawl 32 is so formed that when the disk 33 starts to rotate, it will cam the pawl 32 upwardly until the nose thereof will ride on the periphery of the disk 33. A notch 56 cut in the inner wall of the plate 40 is provided in which the stud 41 moves when the pawl is cammed from the notch in the disk 33, just mentioned. From this it is apparent that the ledger number attachment can be operated independently of the cam shaft 30 for the main machine, and also that the clutch is so constructed that it will automatically adjust itself so that the ledger number attachment will be operated by the main machine.

An interlock is provided which will prevent independent operation of the ledger number attachment after the release of the main machine, and it will also prevent release of the main machine after the ledger number device has been operated independently thereof. The machine to which this attachment is applied is provided with a machine release shaft 57 (Fig. 11) which is rocked in a clockwise direction when the machine is released. Secured to the shaft 57 is an arm 58 which is provided with a stud 59 which projects into a slot 60 in the upper end of a link 61. The lower end of the link 61 is pivoted to an arm 62 which is pivoted on a stud on the before mentioned plate 40. The arm 62 is provided with a surface 63 (Fig. 13), which normally engages the stud 41. When the ledger number device is operated independently of the main machine, it will be remembered the pawl 32 is cammed upwardly, and since the stud 41 is engaged by the arm 62, this movement will cam the arm 62 in a counter-clockwise direction. Counter-clockwise movement of the arm 62 will lower the link 61 until the upper end of the slot 60 comes into engagement with the stud 59. When the link 61 is in this position, the shaft 57 cannot rock, and therefore the main machine cannot be released. From this it is apparent that after the operating handle 50 has been started, it is impossible to release the main machine until after the shaft 34 has received a complete rotation and the pawl 32 is in the notch of the disk 33.

If the main machine is released before the operating handle 50 has been started, the stud 59 will be engaged with the upper end of the slot 60. With the stud in this position it will be impossible to lower the link 61, and therefore it is impossible to rotate the disk 33 independently of the shaft 30 because the arm 62 will prevent the pawl 32 from being cammed out of the notch in the disk 33.

Key banks.

Figure 11:
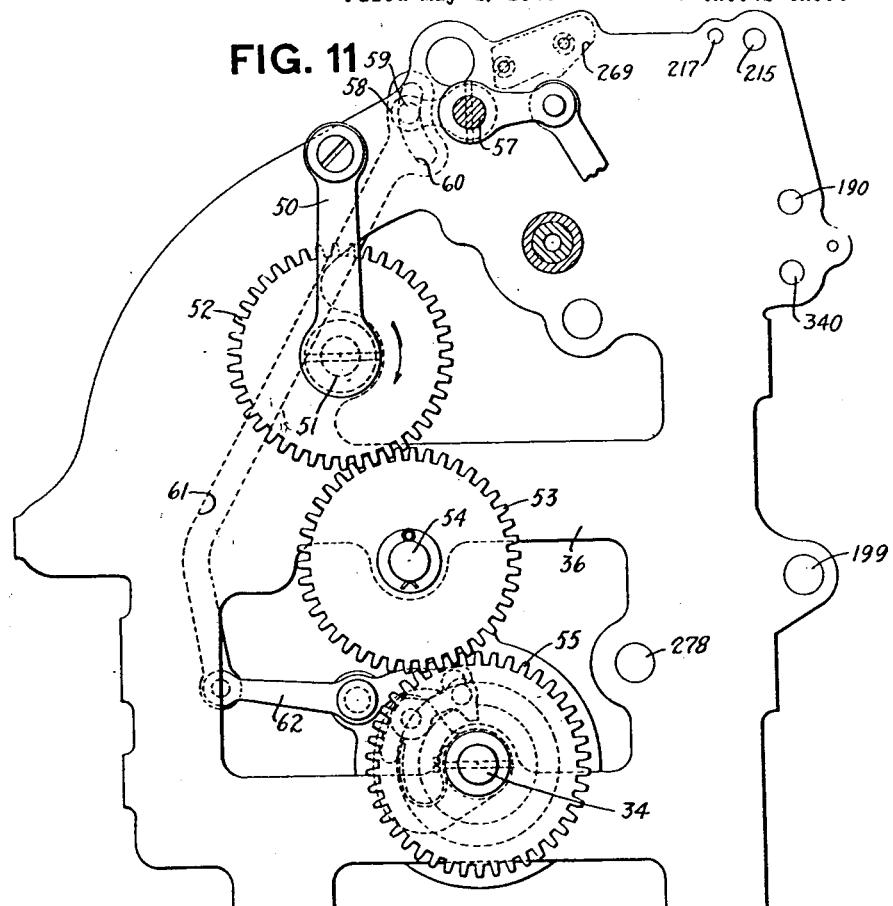
Fig. 11 is an end view of the machine showing the operating mechanism for the ledger numbering device.

Each bank (Fig. 1), is provided with nine keys 70, which are slidably mounted in a frame 71 carried by rods 72 and 73 supported in the frames 35 (Fig. 1) and 36 (Fig. 11). The keys are held in their outer positions by springs (not shown). Each bank is provided with a locking detent 74 which is adapted to cooperate with flattened studs 75 for holding the keys in their depressed positions. The detent 74 is pivoted on a shaft 76 carried by the frames 35 and 36, and is held in its normal position by means of a spring 77 stretched between a stud 78 on the frame 35 and a stud 79 on the detent 74. When a key is depressed, the detent 74 will be rocked in a clockwise direction against the tension of the spring 77 until the stud 75 passes a shoulder 80 whereupon the spring 77 will cause the detent to be rocked counter-clockwise, thereby holding the key in its depressed position.

An interlock is provided to prevent depression of a key 70 after the machine has been released. Secured to the machine release shaft 57 is a plurality of arms 85 which carry a rod 86. When the shaft 57 is rocked, upon release of the machine, the rod 86 is positioned opposite the shoulder 87 of the detent 74. This will prevent rotation of the detent 74 and thereby prevent depression of any of the keys 70. Near the end of the operation of the machine the shaft 57 is given a counter-clockwise movement past its home position and by means of the rod 86 will cam the detents 74 upwardly thereby releasing the depressed keys 70.

Zero stop.

Figure 1:
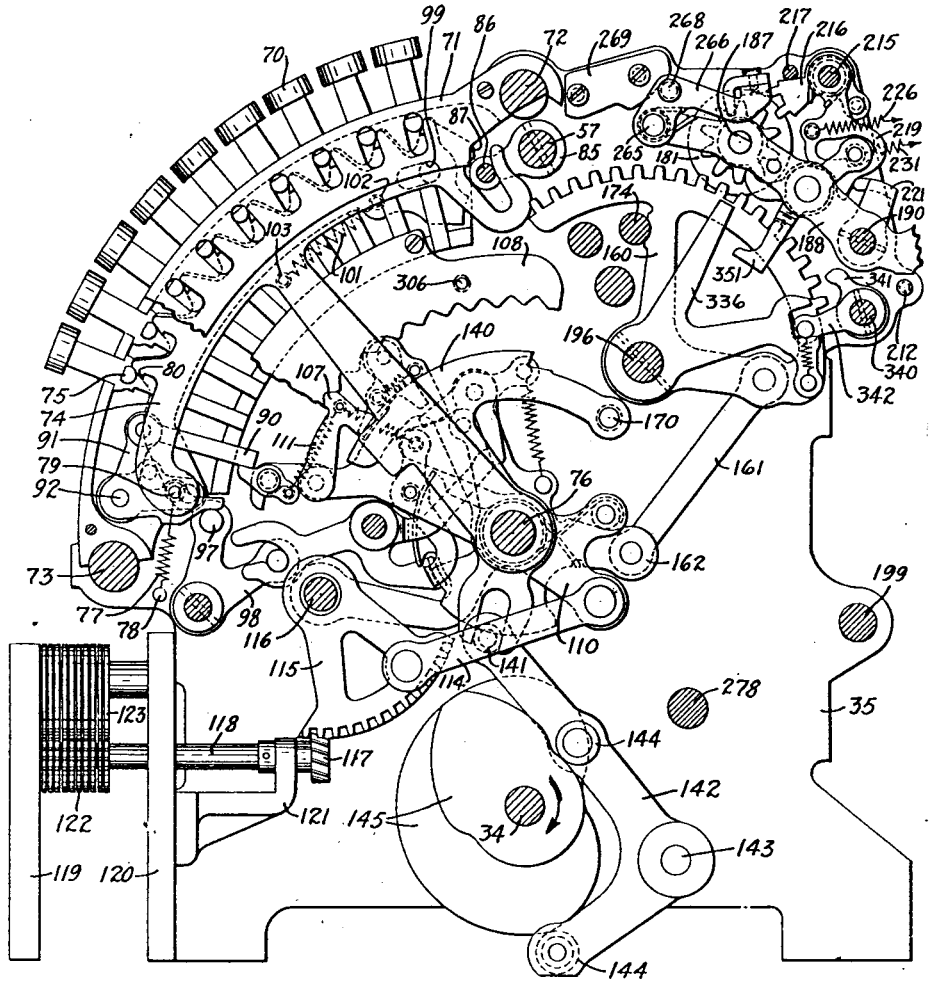
Fig. 1 is a section taken through the units ledger number bank and shows the differential mechanism and also an end view of the totalizer.

A zero stop 90 is provided for stopping the differential in the zero position if no key has been depressed. A detent is provided which cooperates with the keys 70 for moving this zero stop to its ineffective position when any one of the keys is depressed. The zero stop 90 is guided by a slot in the frame 71 and is pivoted to an arm 91 mounted on a stud 92 carried by said frame (Figs. 1 and 4). Also mounted on the stud 92 is an arm 93 to which is pivoted the lower end of a detent 94. Mounted on the arm 93 is a stud 95 against which the arm 91 is held by means of a spring 96 stretched between a stud on the arm 91 and the stud 78. The movement of the arm 91 is limited by a stud 97 carried on an arm 98 to be hereinafter described. The detent 94 is supported at its upper end by a stud 99 carried by the frame 71, and which projects through a slot in the detent 94. The detent 94 is provided with an inclined surface 100 for each stud 75. When a key 70 is depressed, its stud 75 will engage the inclined surface 100, thereby camming the detent 94 upwardly and causing the arm 93 to move upwardly. This movement of the arm 93 will cause the arm 91 to be rocked counter-clockwise by means of the stud 95, thereby moving the zero stop 90 to its ineffective position. The detent 94 is held in engagement with the stud 75 by means of a spring 101 stretched between a stud 102 on the detent and a stud 103 on the frame 71.

Differential.

Figure 15:
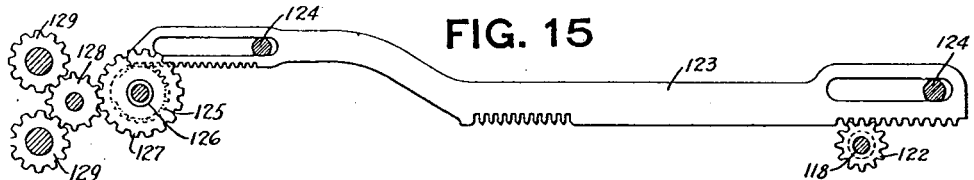
Fig. 15 is a detail view of one of the type wheel racks and its associated parts for adjusting the type carriers.

Loosely mounted on the above mentioned rod 76 is an arm 110 (Figs. 1 and 2) which has pivoted thereto a latch 111. The latch 111 is provided with a pivoted pawl 112 which is adapted to engage either the zero stop pawl 90 or the end of a depressed key 70. The pawl 112 is held in its effective position by means of a spring 113 stretched between a stud on the pawl 112 and a stud on the latch 111. Pivoted to the arm 110 is a link 114, the other end of which is pivoted to a segment 115 mounted on a rod 116 carried by the frames 35 and 36. The segment 115 meshes with a spiral pinion 117 secured to a shaft 118 carried by frames 119 and 120 and by a bracket 121. Also secured to the shaft 118 is a pinion 122 (see also Fig. 15) which meshes with a rack 123 carried by studs 124. The rack 123 meshes with a pinion 125 secured to one end of a sleeve 126, to the other end of which is secured a pinion 127. The pinion 127 meshes with a pinion 128 meshing with type wheels 129.

Loosely mounted on the rod 76 is a driving segment 140 which is bifurcated at its lower end to engage a roller 141 (Figs. 1 and 2) mounted on a bell crank 142 pivoted on a rod 143 carried by the frames 35 and 36. The arm 142 is provided with two rollers 144 which cooperate with cam plates 145 secured to the operating shaft 34. The driving segment 140 is provided with a concentric surface against which the latch 111 bears after it is disconnected from a shoulder 149 on the segment. When the shoulder 149 radially alines with the latch 111 as the segment is moved counter-clockwise, the latch is moved behind the shoulder by a spring 146 stretched between a stud 328 on the latch and a stud 147 carried by a coupling pawl 148 hereinafter described.

Figure 16:
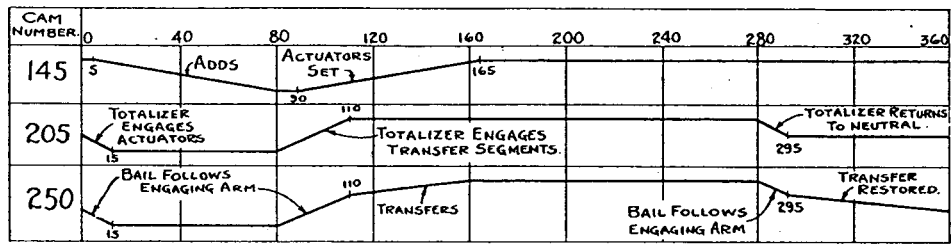
Fig. 16 is a time chart of the various cams during adding operations.

The segment 140 is adapted to be rocked first in a counter-clockwise and then in a clockwise direction by means of the cam plates 145 and the arm 142 as shown in the time chart (Fig. 16). Upon clockwise movement of the driving segment 140 it will carry the member 110 in a clockwise direction until the pawl 112 engages the zero stop 90 or a depressed key, whereupon the latch 111 will be cammed in a counter-clockwise direction to disengage it from the driving segment 140. This will cause a nose 107 of the latch 111 to be rocked into engagement with a notch in a plate 108 secured to the key frame 71, thereby locking the latch and member 110 in its adjusted position. In this manner the arm 110 is adjusted commensurate with the key depressed, and by means of the link 114, segment 115, pinion 117 and the parts associated therewith, will adjust the type wheels 129 according to the value of the depressed key.

After the type carriers have been adjusted, an impression may be taken by any of the well known printing mechanisms such as, for example, that shown and described in Letters Patent of the United States No. 1,524,755, issued to Bernis M. Shipley, February 3, 1925. No disclosure or description of the printing mechanism is given herein as it forms no part of the present invention and reference may be had to the patent.

An actuator 160 (Figs. 1 and 3) is provided for each bank of keys for entering amounts into the totalizer, commensurate with the value of the key depressed. Pivoted to the actuator 160 is a link 161 which is pivoted at its lower end to an arm 162 (see also Fig. 2). The arm 162 is adapted to be moved by the arm 110 during adding operations. The arm 162 is held in engagement with a stud 163 carried by the arm 110 by means of a coiled spring 164 which is wound around the shaft 76, with one end engaging the stud 163 and the other end engaging the arm 162. When the driving segment 140 rotates the arm 110 in a clockwise direction for positioning it under control of the depressed key, the stud 163 will rock the arm 162 clockwise therewith. This movement will be transferred to the actuator 160 and, therefore, it is apparent that the actuator will be set commensurate with the value of the depressed key. During the time the actuator 160 is being positioned, the totalizer remains disengaged therefrom. However, at the beginning of the succeeding operation, and before the driving segment 140 is moved in a counter-clockwise direction, the totalizer will be engaged with the actuators 160. At the end of the operation of the machine, the arm 110 is left in the position to which it was adjusted under the control of the depressed key and therefore the actuator 160 will also be left in its adjusted position. During the first part of the next succeeding operation of the machine, and after the totalizer has been engaged with the actuator, the arm 110, together with the actuator 160, is returned to its zero position before it is again adjusted under control of a depressed key.

The time during which the adding takes place is indicated in the time chart (Fig. 16). This chart shows that the actuator segment 140 starts to move in a counter-clockwise direction at 5 degrees of movement of the cam plates 145 and completes its movement at 80 degrees. The totalizer is engaged at 15 degrees and remains engaged until 80 degrees whereupon it is again disengaged. The actuators 160 are set for the next operation, between 90 and 165 degrees of movement of the cams 145 during which time the totalizer remains disengaged.

Mounted on the driving segment 140 is a stud 170 which is adapted to engage the surface 171 of the arm 110 when the driving segment is being rotated in a counter-clockwise direction. From this it is apparent that as the driving segment 140 is rocked during the first part of an operation of the machine the stud 170 will pick up the arm 110 and carry it to its lower-most position.

When the driving segment is rocked counter-clockwise as just mentioned the stud 163 will be rocked away from the arm 162, and since the arm 162 is only connected to the arm 110 by means of the spring 164, which spring is not strong enough, as will be explained later, to cause the arm 162, link 161 and segment 160 to operate to enter amounts, it is necessary to provide another means for operating this train of mechanism. This means consists of the before mentioned pawl 148 which is pivoted on the arm 110. The pawl 148 is provided with a flange 172 which projects into the path of a shoulder 173 on the arm 162. Therefore when the arm 110 is rocked counter-clockwise by the stud 170 on the driving segment 140, the arm 162 will be positively driven and, by means of a link 161, will cause the actuator 160 to be driven in a counter-clockwise direction, thereby entering into the totalizer wheels the amounts which have been set up in the actuator during the previous operation. The movement of the actuator 160 is limited by a rod 174 carried by the frames 35 and 36.

It will be noticed that there is a space between the flange 172 and the shoulder 173. This is necessary because when the arm 162 is moved in a counter-clockwise direction, it is only moved to its zero position, whereas the arm 110 must move past its zero position far enough to permit sufficient movement in a clockwise direction for disengaging the latch 111 from the driving segment 140 when the latch is disengaged by means of a zero stop 90.

The spring 146, which is adapted to hold the latch 111 in back of the shoulder 149 is also adapted to hold the pawl 148 in engagement with the shoulder 173 on the arm 162. In order to prevent accidental disengagement of this pawl during an operation of the machine, a means is provided for preventing this disengagement after the machine has started to operate. Mounted on the before mentioned rods 76 and 116 is a plate 180 which is provided with a flange 181 which is concentric with the shaft 76. The flange 181 is disposed to hold the flange 172 in engagement with the arm 162 after the machine has started to operate, in case there is any tendency for the pawl 148 to swing clockwise.

Totalizer.

A totalizer element 185 (Figs. 1, 3, 7 and 8) is provided for each actuator 160. Secured to each of the elements 185 is a pinion 186 which is mounted on a rod 187 carried by two arms 188 mounted on a shaft 190 supported by the frames 35 and 36. Secured to each of the pinions 186 is a one-toothed member 189, which is provided for the purpose of tripping a transfer mechanism when a totalizer element passes from nine to zero.

Totalizer engaging mechanism.

As before mentioned the totalizer is engaged with its actuators at the beginning of an operation. The mechanism for engaging the totalizer with the actuators is also used for engaging it with the transfer segments to be hereinafter described. It is sufficient to state here that the totalizer is normally in an intermediate position and is first rocked to engage it with its actuators, and then to disengage therefrom and to engage it with the transfer segments by means of a cam 205 (Fig. 10).

The totalizer shaft 187 is flattened at its right hand end, as shown in Figs. 1 and 10. Loosely mounted on the before mentioned shaft 190 (Fig. 10), is an arm 191 which has pivoted thereto a pawl 192 which is held in engagement with the flattened portion of the shaft 187 by means of a spring 193 stretched between a stud on the pawl and a stud on one of the arms 188. Mounted on the arm 191 is a stud 194 which projects into the cam slot in the bell crank 195 pivoted on a shaft 196 carried by the frames 35 and 36. One arm of the bell crank 195 is bifurcated to engage a stud 197 mounted on an arm 198 pivoted on a shaft 199. Pivoted to the arm 198 is a link 200, the other end of which is pivoted to an arm 201 by means of a stud 202. The arm 201 is pivoted on a rod 203 carried by the frames 35 and 36. Mounted on the stud 202 is an anti-friction roller which is adapted to project into a cam slot 204 cut in the side of a cam 205 secured to the shaft 34. The cam slot 204 is so shaped that at the beginning of the rotation of the cam 205, it will rock the arm 201 counter-clockwise, and by means of the link 200 rock the arm 198 counter-clockwise, and by means of the stud 197 rock the bell crank 195 clockwise. This movement of the bell crank 195, by means of its cam slot, will cam the arm 191 downwardly, and by means of the pawl 192 will rock the arms 188, together with the totalizer elements, counter-clockwise to engage the pinions 186 with the actuators 160. After the pinions have been engaged with the actuators, the actuators are turned to their zero positions, thereby entering the amounts into the totalizer elements. After an amount has been entered therein, the cam 205 will cause the bell crank 195 to be rocked counter-clockwise far enough to not only disengage the pinions from the actuators, but to engage them with the transfer segments in a manner to be presently described.

From the above it is apparent that the totalizer elements are engaged with the actuators positively by means of the pawl 192. However, it is necessary to provide another means for causing the arm 188 to rock clockwise to disengage from the actuators when the arm 191 and the pawl 192 are rocked upwardly. Each of the arms 188 is provided with a stud 210, to which is fastened one end of a spring 211, the other end of which is attached to a stud 212. The spring 211 normally tends to rotate the arms 188 in a clockwise direction, but is prevented from doing so by the pawl 192. When the totalizers are being engaged with the actuators, the pawl 192 will cause the arms 188 to rock in a counter-clockwise direction against the tension of the springs 211, and, when the arm 191 and the pawl 192 are rocked upwardly, by the bell crank 195, the springs 211 will cause the arms 188 to follow. The stud 212 will limit the movement of the arms 188 to a position in which the totalizer pinions are permitted to engage the transfer segments.

Transfer mechanism.

A mechanism is provided for carrying one from a lower to a higher order denomination, when the lower order wheel passes from nine to zero. The transfer mechanism herein disclosed is of the type in which the transferring is completed after the totalizer is disengaged from the actuators, and after it is engaged with special transfer segments.

Loosely mounted on the rod 215 (Figs. 3 and 6), adjacent each totalizer element, is a segment 216. The rod 215 is carried by the frames 35 and 36. The segment 216 is held in engagement with a rod 217 by means of a spring 218 which is wound around the rod 215, one end of which is attached to the segment 216, and the other end is attached to an arm 219, also loosely mounted on a rod 215. The arm 219 is provided with a downwardly projecting lug 220, which is normally held in engagement with a flange 221 of an arm 222 secured to the before mentioned shaft 190. The arms 188 each have an upwardly projecting portion 223 between which is mounted a rod 224. Stretched between the rod 224, and a stud 225 mounted on the arm 219 is a spring 226, for each arm 219, which normally tends to rock the arm 219 in a counter-clockwise direction, but is prevented from doing so by the flange 221. Adjacent each totalizer wheel, except the highest denomination, is an arm 227 (see also Fig. 7), which is secured to an arm 228 by means of a sleeve 229 loose on a rod 233 carried by the arms 188. The arm 228 has mounted thereon a flattened stud 230 which is adapted to project into an irregular shaped slot in the arm 219. The arm 227 projects into the path of the one tooth member 189 secured to the totalizer element. A spring 231 stretched between the stud 230 and a rod 232, carried by the arms 188, normally tends to rock the arms 227 and 228 clockwise.

Also secured to the shaft 190 (Fig. 6) is an arm 240 which has mounted thereon a stud 241 which projects into a bifurcated arm 242 of a bell crank 243 mounted on the before mentioned shaft 196. The other arm of the bell crank 243 is bifurcated to engage a stud 244 mounted on an arm 245 pivoted on the before mentioned shaft 199. Pivoted to the stud 244 is a link 246, the lower end of which is pivoted to an arm 247 by means of a stud 248. The arm 247 is loosely mounted on the before mentioned shaft 203. The stud 248 has mounted thereon an anti-friction roller which projects into a cam slot 249 cut into the side of a cam 250 mounted on the cam shaft 34.

When the totalizer is rocked counter-clockwise to engage the pinions 186 with the actuators 160, the studs 230 on the arms 228 will cause the arms 219 to rock about the shaft 215. The cam slot 249 is so shaped that it will cause the arms 222 to follow the arms 219. However the arm 219 will move farther than the arm 222 so as to leave enough clearance between the flange 221 and the lug 220 to permit the arm 219 to rock slightly counter-clockwise when the one-tooth member 189 trips the arm 219 in the following manner. As the totalizer element passes from nine to zero, the one-tooth member 189 engages the arm 227 thereby rocking the arm 228 counter-clockwise far enough to disengage the flattened stud 230 from the shoulder 260. After the flattened stud has been disengaged from the shoulder 260, the spring 226 will cause the arm 219 to be rocked slightly counter-clockwise until the projection 220 engages the flange 221. When the totalizer disengages from the actuators 160, it moves past the intermediate position until the totalizer elements 186 engage the segments 216. At the same time the cam race 249 rocks the arm 222 clockwise in the same direction. This will prevent the flattened stud 230 from reengaging the shoulder 260. After the totalizer pinions have been entirely engaged by the segments 216, the arms 188 will have reached their maximum movement. However, the cam 250 will cause the arm 222 to move further in a clockwise direction, thereby permitting the spring 226 to rock the arm 219 counter-clockwise. This counter-clockwise movement of the arm 219 causes it to engage a stud 261 carried by the segment 216, thereby rocking the segment in a counter-clockwise direction therewith. The segment 216 will be engaged by the element of higher order wheel and the arm 227 will be tripped by the one tooth member of the lower order element as the lower order wheel passes from nine to zero, and in this manner one will be carried to the higher order element. The time during which the cams 205 and 250 perform the above mentioned functions and their cooperation, is shown in the time chart (Fig. 16).

If a higher order element passes from nine to zero due to the transfer which has been effected therein, the one tooth member 189 for this order will be tripped, thereby disengaging its flattened stud 230 from the shoulder 260 of the arm 219 associated with the segment 216 of the next higher element. At this time the flange 221 will have been disengaged from the projection 220, and therefore the transfer into this next higher order element will be effected immediately by its spring 226. In this manner transfers may be effected from the lower through to the highest order element in the totalizer.

Figure 3:
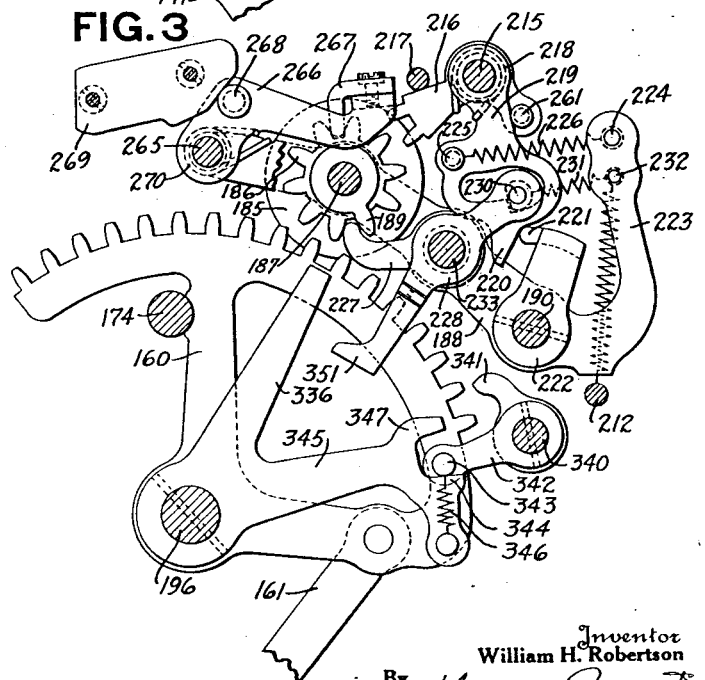
Fig. 3 is an enlarged sectional view of the totalizer together with one of the actuators.

After all of the transfers have been effected, the arms 188 will again move away from the segments 216 and the arm 222 will follow therewith until the totalizer reaches its intermediate or home position, whereupon the arm 222 will move an additional distance until all of the studs 230 are again positioned behind the shoulder 260, as shown in Fig. 3.

Totalizer aliner.

A device is provided for holding the totalizer elements in proper alinement while they are in their intermediate position, as shown in Fig. 3. This device is adapted to be disengaged from the pinions when the pinions are engaged with either the actuators 160 or the transfer segments 216. The arms 188 are provided with extensions which support a rod 265. Loosely mounted on the rod 265 is a pair of arms 266 to which is secured an alining member 267. Mounted on each of the arms 266 is a stud 268 which is normally held in engagement with a block 269. One of the blocks is secured to the frame 35, and the other to the frame 36. A spring 270 is wound around the rod 265, one end of which engages the arm 266, and the other end engages a projection on the arm 188. The block 269 is so formed that when the totalizer is rocked to engage the actuators 160, it will permit the spring 270 to rock the arms 266 in a counter-clockwise direction far enough to disengage them from the pinions 186 and also to effect this disengagement when the pinions are rocked into engagement with the transfer segments 216.

Total taking operations.

The mechanism has now been described for accumulating amounts into the totalizer. The method for taking a total from the totalizer will be described next. The machine is provided with a sight opening 275, (Fig. 9) through which the total can be read. As previously stated, the amount is added into the totalizer during the next operation subsequent to that operation in which said amount was set up on the keyboard. Therefore, before the correct total can be read, an idle operation must be made, during which the amount that was set up on the keyboard during the next preceding operation will be added into the totalizer.

A means is also provided for printing the total on the record and for controlling the machine whereby the totalizer will be either turned to zero, or the amount will be added back into the totalizer during the first part of the next operation after the total taking operation. The last mentioned operation will be herein known as a "read" operation, and the former as a "reset" operation.

During total taking operations, the arm 162 (Fig. 2) is adjusted under control of the totalizer element, in which position this element will be automatically locked, and the arm 110 will thereafter be moved to a position as determined by the arm 162, thereby adjusting the type carriers according to the amount on the totalizer.

The time and manner of engagement and disengagement of the totalizer with the actuators during total taking operations is identical with that during adding operations. It is, however, necessary to perform two cycles of operation during total taking operations. During the first cycle the amount which was previously set up in the actuators is added into the totalizer elements, and during the second cycle the total is transferred from the totalizer elements to the arm 162 for controlling the arm 110. During total taking operations it is also necessary to provide additional means for controlling the differential mechanism and the totalizer elements for properly controlling the adjustment of the differential. A total lever is provided for operatively connecting these mechanisms with the operating shaft 34 during total taking operations.

Figure 14:
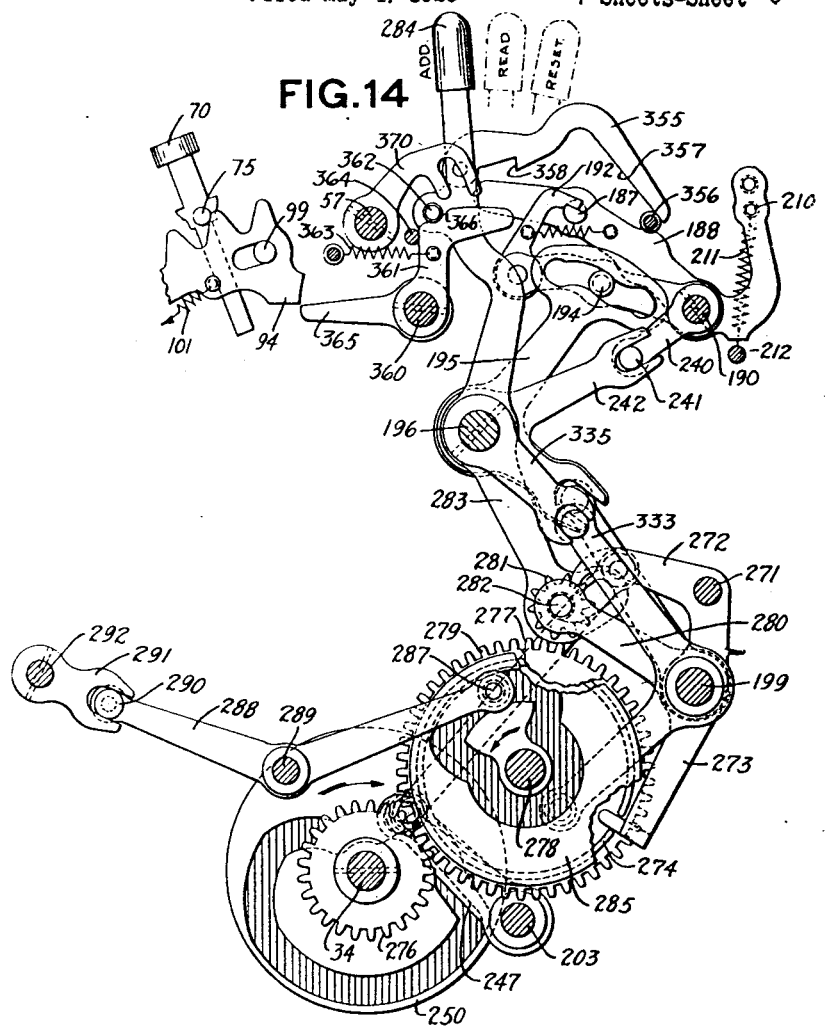
Fig. 14 is a detail view of the total lever and the various parts controlled thereby.

Secured to the cam shaft 34 (Fig. 14) is a gear 276 which meshes with a gear 277 loose on an auxiliary cam shaft 278. The gear 277 is of such a ratio to the gear 276 as to require two complete rotations of the gear 276 for one rotation of the gear 277. Adjacent the gear 277 is a gear 279 identical therewith, which is secured to the shaft 278. Loosely mounted on the shaft 199 is an arm 280 which carries a wide pinion 281 which is adapted to engage both the gears 277 and 279 for coupling these two gears together. The pinion 281 is mounted on a stud 282 which projects into a slot in the lower end of a lever 283 which is provided with a knob 284 which projects through the cabinet of the machine. When it is desired to perform a total taking operation, the lever 284 is adjusted to either read or reset position, shown by dot-and-dash lines in Fig. 14, which movement will cam the arm 280 downwardly to cause the pinion 281 to engage with the gears 277 and 279. When the shaft 34 is rotated during an operation of the machine, the shaft 278 will be rotated by means of the gears 276, 277 and 279 and the coupling pinion 281.

An aliner is provided for the pinion 281 so that it will be in the proper position for engaging the gears 277 and 279. Mounted on the shafts 199 and 271 is an alining arm 272 which is stationary and forms an aliner for the pinion 281 when it is disengaged from the gears 277 and 279.

A means is also provided for holding the gear 279 and the mechanism on the shaft 278 in proper alinement, so that when the machine is operated with the shaft 278 coupled to the shaft 34 by means of the pinion 281, the various cams thereon will be in proper time. Integral with the arm 280 is an alining arm 273 which has an alining tooth which projects into a slot of a circular flange 274 on the side of the gear 279. When the arm 280 is rocked counter-clockwise to engage the pinion 281 with the gears 277 and 279, as above described, the alining member of the arm 273 will be disengaged from the flange 274, thereby permitting rotation of the gear 279 and the shaft 278.

Zero stop throwout mechanism.

Figure 17:
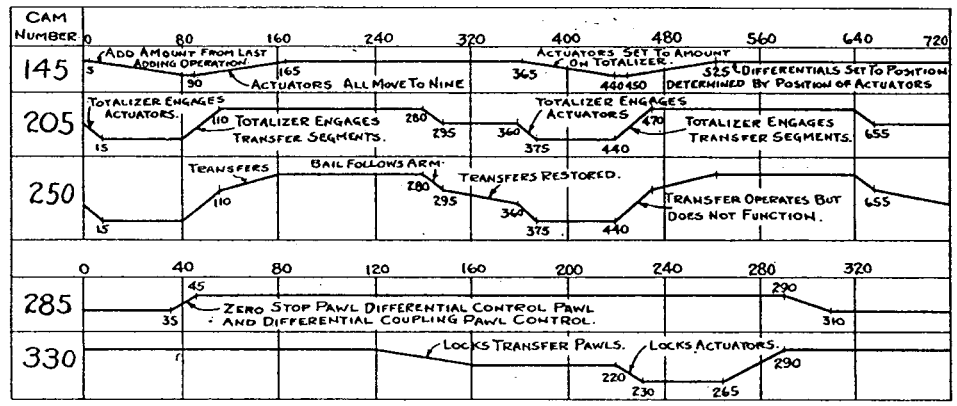
Fig. 17 is a time chart of the various cams during total taking operations.

In order to permit the differential mechanism to be adjusted under the control of the totalizer elements, it is necessary to move the zero stop 90 (Figs. 1 and 4) to its ineffective position. Secured to the shaft 278, just described, is a cam 285 which is provided with a cam slot 286 into which projects a roller 287 carried by a lever 288 pivoted on a stud 289 carried by the frame 36. Also mounted on the lever 288 is stud 290 which cooperates with a bifurcated arm 291 which is secured to a shaft 292 carried by the frames 35 and 36. Also secured to the shaft 292 is the before mentioned arm 98 which carries the stud 97. The lower end of the arm 91 is provided with a cam surface with which the stud 97 is adapted to cooperate. Near the beginning of a total taking operation, that is, at 35 degrees, as shown in Fig. 17, the cam slot 286 will cause the lever 288 to be rocked in a clockwise direction, and by means of the arm 291 will rock the arm 98 counter-clockwise. Counter-clockwise movement of the arm 98 by means of the stud 97 will cam the arm 91 in a counter-clockwise direction, thereby moving the zero stop 90 to its ineffective position. This movement of the zero stop is effected before the differential moves in a clockwise direction during the first cycle of operation, as shown in the time chart (Fig. 17) thereby permitting the differential to be adjusted under control of the totalizer elements. Near the end of a total taking operation, that is, at 310 degrees, which is after all of the parts have been adjusted under control of the totalizer elements, the zero stop 90 will again be moved to its effective position by the cam race 286.

Differential adjustment for total taking.

During the first cycle of a total taking operation, the totalizer pinions engage the actuators and the amounts are added therein in a manner identical with that described for adding operations, that is, the stud 170 of the driving segment 140 (Fig. 2) engages the surface 171 of the member 110, thereby causing it to rotate counter-clockwise past its zero position. This movement, by means of the coupling pawl 172 engaging the shoulder 173, causes the arm 162 to rock counter-clockwise to its zero position, and by means of the link 161 and segment 160 (Fig. 3) causes amounts set up on the keyboard during the next preceding adding operation to be entered into the totalizer elements. When the member 110 and the arm 162 have been adjusted to their zero positions the arm 162 is uncoupled from the arm 110 to permit independent adjustment of the arm 162 under control of the totalizer elements. This is accomplished by the cam race 286 (Fig. 4), lever 288, arms 291 and 98, above mentioned. Mounted on the arm 98 (Figs. 2 and 4) is a stud 300 which engages a cam slot 301 cut in the end of a lever 302 loosely mounted on a rod 303 carried by the frames 35 and 36. The lever 302 is provided with a downwardly projecting arm 304 having a flange 305 which engages the flange 172 when the parts are in their zero positions. When the arm 98 is rocked by the cam race 286, as above described, the stud 300, by its engagement with the cam slot 301, will cause the lever 302 to be rocked in a clockwise direction, thereby rocking the coupling pawl 172 clockwise out of the path of the shoulder 173.

During the latter part of the first cycle of operation, when the driving segment 140 receives its clockwise movement, the arm 110 is carried clockwise by means of the latch 111, as before described. During this time it is necessary to maintain the coupling pawl 148 in its ineffective position. This is accomplished as follows. After the arm 110 has started to move, the flange 172 of the pawl 148 engages the outer surface of the flange 181 in the plate 180, thereby preventing the spring 146 from rocking the pawl into engagement with the arm 162. The flange 181 is long enough to prevent this engagement during the complete upward and downward movement of the arm 110.

During the clockwise movement of the arm 110, the arm 162 and the actuator 160 connected thereby by means of a link 161, will be rocked clockwise in the same manner as during adding operations. However, during this movement of these members, the zero stop pawl 90 will have been rocked to its ineffective position, and no key 70 will have been depressed. Therefore it is necessary to provide another means for controlling the extent of movement of the arm 110. It is desired to stop the actuators during this part of the operation in the "9" position. In order to disengage the latch 111 from the driving segment 140 in the "9" position, a stud 306 is provided which is secured to the before mentioned plate 108, which is so located as to cause the latch to be disengaged from the segment 140 when the arm 110 arrives at the "9" position.

After the actuators have been adjusted to the "9" position, and the second cycle of operation is started, the totalizers again engage the actuators. Then when the driving segment 140 begins to move in a counter-clockwise direction, the actuators 160 start to move in an adding direction, thereby turning the pinions 186 in an adding direction. This movement of the actuators will continue until the totalizer wheels arrive at their "9" position, whereupon they will be stopped by means to be hereinafter described, and prevent further movement of the actuator 160 and the arm 162. However, the driving segment 140 will continue to move, thereby carrying the arm 110 further in a counter-clockwise direction. This independent movement of the arm 110 is permitted by reason of the fact that the pawl 172 was disengaged from the arm 162 as above described, and because the spring 164, flexibly connects the arms 162 and 110. The springs 164 are preferably made just strong enough to insure the resetting of the totalizer and the re-entry of the total in a non-clearing total operation. This is desirable in order to prevent a hard operation when these springs are stretched in total taking operations. If springs of such strength are used, they may not be sufficiently strong to trip the transfers as in adding operations, and therefore the latch 148 hereinbefore described has been provided to insure the proper movement of the actuators in adding operations.

After the arm 110 has been moved to its zero position, a means which will be hereinafter described, is rocked into engagement with the actuator 160, thereby locking it positively in the position to which it was adjusted under control of the totalizer pinion. After the actuator has thus been positively locked, the totalizer will be disengaged therefrom. When the totalizer has been disengaged from the actuators, the driving segment 140 starts its second clockwise movement, thereby carrying the arm 110 in a clockwise direction until the latch is disengaged therefrom by a pawl 310 carried by the arm 162, which will now be described.

Figure 2:
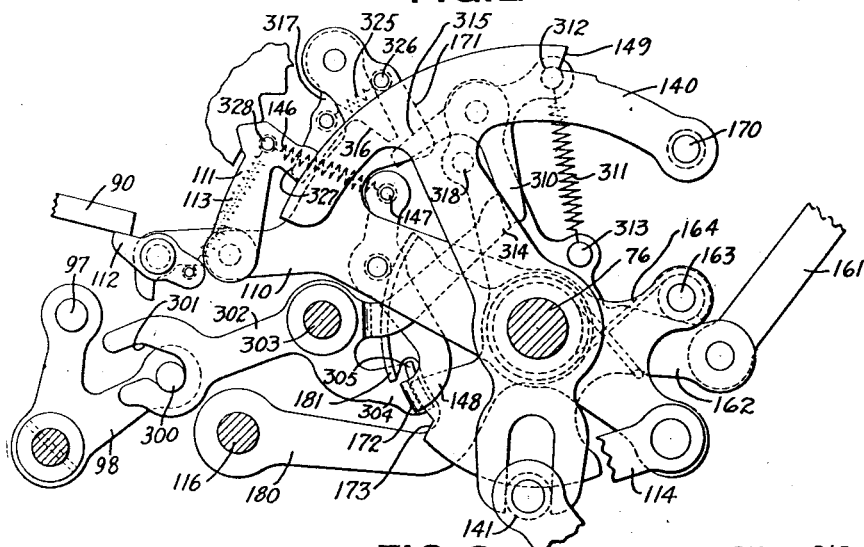
Fig. 2 is an enlarged detail of the differential mechanism.

Pivoted on the arm 162 is the spring-pressed pawl 310, (Fig. 2). A spring 311 stretched between a stud 312 on the pawl 310 and a stud 313 on the arm 162, normally tends to rotate the pawl 310 in a clockwise direction. This clockwise movement of the pawl 310 is prevented when the mechanism is in the home position by means of an arm 314 which forms a part of the lever 302. When the differential starts its first clockwise movement, and the pawl 310 is moved away from the arm 314, the spring 311 will rock the pawl 310 clockwise until a forwardly projecting arm 315 thereon engages a downwardly projecting arm 316 of a pawl 317 pivoted on the arm 110. During the second cycle of a total taking operation, when the arm 162 is stopped under control of a totalizer element, and the arm 110 moves on independently thereof, the spring 311 will cause the pawl 310 to rotate further clockwise until it is stopped by engagement with a stud 318 carried by the arm 162. This will position the arm 315 of the pawl 310 in the path of the arm 316 of the pawl 317 when the arm 110 receives its second clockwise movement, as above described.

A spring 325 stretched between a stud on the pawl 317 and a stud 326 on the arm 110 normally holds the pawl 317 in engagement with the stud 326. The pawl 317 is provided with an arm 327 which lies in the path of a stud 328 on the latch 111. When the driving segment 140 receives its second clockwise movement, the latch 111 will be in engagement with the shoulder 149 thereof. When in this position, the stud 328 will be engaged with the arm 327 of the pawl 317. As the arm 110 is rocked clockwise during the second cycle of a total taking operation, the arm 316 of the pawl 317 will come into contact with the arm 315 of the pawl 310, thereby causing the pawl 317 to rotate in a clockwise direction. This clockwise movement of the pawl 317 will disengage the latch 111 from the shoulder 149 of the driving segment 140. When the latch 111 is disengaged from the driving segment 140, the nose 107 of the latch 111 will be rocked into engagement with a notch in the plate 108 in the same manner as during adding operations, when the latch is disengaged from the driving segment by the depressed key.

It will be remembered that the totalizer wheel is moved in the adding direction when the actuator is adjusted under control thereof. This movement of the totalizer element will not be the true movement of the amount contained on the element, but rather the complement thereof. However, since the member 162 is moving from "9" towards "0" at the time, it can be seen that the movement of this member 162 will also equal the complement of the amount on the totalizer element, and it will therefore be positioned to the position commensurate with the amount on the totalizer element. Then as the arm 110 is adjusted under control of the arm 162, this arm will move the correct amount, which was standing on the totalizer element. It will also be remembered that the type carriers are adjusted by the arm 110 and therefore the correct amount will be set up on the type carriers, which amount will be printed in any well known manner.

*Totalizer element stop.*

As above mentioned, a device has been provided for positively stopping the totalizer elements when they reach the "9" position for positioning the type wheels for total taking operations. Secured to the shaft 278 (Fig. 5) is a cam 330 which has a cam race 331 into which projects a roller 332 of a bell crank 333. Mounted on the upwardly extending arm of the bell crank 333 is a stud 334 which engages a bifurcated arm 335 secured to the beforementioned shaft 196. Adjacent each totalizer element, and secured to the shaft 196 is an arm 336 which lies in the plane of the trip arm 227. Near the end of the first cycle of a total taking operation, and after amounts have all been entered into the totalizer elements, the cam 330 will rock the arm 336 clockwise far enough to position it in the path of the trip arm 227. When the totalizer engages the actuators during the beginning of a second cycle of operation, the trip arm 227 will engage the upper end of the arm 336. When the actuator 160 turns the elements 181 in an adding direction, as above described, and the one-tooth member 189 engages the arm 227. the element 181 will be stopped because the arm 336 will prevent rotation of the trip arm 227, and in this manner further movement of the totalizer element is prevented.

Actuator lock.

As beforementioned, a device has been provided for locking the actuators 160 in the position to which they were adjusted under control of the totalizer elements, in order to provide an unyielding means for disconnecting the latch 111 from the driving segment 140, as above described. Secured to a shaft 340 (Fig. 5), adjacent each actuator, is an arm 341. Also secured to the shaft 340 is an arm 342 which has mounted thereon a stud 343, which is held in engagement with a shoulder 344 of an arm 345 integral with the arm 336 by means of a spring 346. As just described, the arm 345 is given a clockwise movement at the end of the first cycle of the total taking operation. This movement will cause the spring 346 to rock the arms 341 into engagement with the respective actuators 160. However, the arm 345 is provided with a cutout which will permit the arms 341 to flexibly move in and out of the teeth as the actuators 160 are being adjusted. After the actuators have been adjusted, the cam 330 will cause the arm 336, together with the arm 345, to rock further clockwise, whereupon a projection 347 on the arm 345 will engage the stud 343, thereby preventing the arms 341 from moving out from between the teeth of their respective actuators. From this it is apparent that during the latter part of the second cycle of operation, the actuators 160 will be positively locked.

From the above it is apparent that at the end of a total taking cycle of operation, the actuators 160 will be in a position commensurate with the amounts which were standing upon the totalizer elements at the beginning of the operation. During the first part of an operation of the machine succeeding a read operation, the totalizer will be engaged with the actuators in the same manner as during an adding operation, and therefore this amount will be again added into the totalizer elements.

Turn-to-zero mechanism.

It will be rememberd that during total taking operations, the totalizer wheels are all set to their "9" positions by the actuators 160. In order that the correct amount will be standing on the totalizer at the end of the next operation it is necessary to provide some means for turning these elements to zero.

Adjacent the units totalizer element is a segment 216 (Fig. 6), which is similar to the transfer segments, above described. Cooperating with the segment 216 is the arm 219 (Fig. 5) which is controlled by an arm 350 loosely mounted on the beforementioned rod 233. The arm 350 is provided with a downwardly projecting toe 351 which lies in the path of the arm 336, above described. When the arm 336 moves to lock the actuators 160, as above described, the arm 336 will engage the toe 351, thereby causing the arm 350 to rock in a counter-clockwise direction. This movement will release the arm 219, thereby permitting the spring 226 to rock the segment 216 for the units wheel one step in an adding direction, thereby turning this wheel to zero. When this wheel turns to zero its one-tooth member 189 will cause a transfer to be made into the tens wheel, which in turn will also return to zero. In this manner transfers are carried across the totalizer until the highest element has been turned to zero.

Reset operation.

A reset operation, that is one in which the amount taken from the totalizer is not again entered into the totalizer, is the same as the read operation just described, except that during the next succeeding cycle of operation the totalizer is not engaged with the actuators 160. The means for preventing this is as follows:

Pivoted on the lever 283 (Fig. 14) is a pawl 355 which normally rests on a stud 356 carried by the side frame 36. The pawl 355 is provided with a surface 357 which is so shaped that when the lever is moved to the reset position a shoulder 358 on the pawl 355 will engage the rear edge of the pawl 192. After the operation has been completed, and the total lever is returned to the add position, the pawl 355 will disengage the pawl 192 from the rod 187. It will be remembered that the arms 188 normally tend to rock in a clockwise direction under the influence of springs 211. Therefore when the pawl 355 disengages the pawl 192 from the rod 187, the springs 211 will cause the arms 188 to rock in a clockwise direction until the totalizer pinions engage the transfer segments 216. Upon operation of the machine after the disengagement of the pawl 192, the totalizer will not be engaged with the actuators 160 and therefore the amount standing upon the actuators will not be added therein.

Interlocks.

An interlock is provided in order to prevent depression of a key 70 when the total lever is either in the read or reset position. Secured to a shaft 360 (Fig. 14), is an arm 361 which lies in the path of a stud 362 mounted on the lever 283. A spring 363 normally holds the arm 361 in engagement with a stud 364 carried by the frame 36. Adjacent each detent 94 is an arm 365, each of which is secured to the shaft 360. When the total lever is moved to either the read or reset position, the stud 362 will engage a cam surface 366, thereby rocking the arm 361, together with the arms 365, clockwise to position the ends of the arms 365 into the path of the detents 94, thereby preventing movement thereof. This will prevent depression of a key 70 because it is impossible to depress a key when the detent 94 is locked.

An interlock is also provided to prevent adjustment of the total lever after the main machine has been released. Secured to the key release shaft 57 (Fig. 14), is a bifurcated arm 370 which is also in the plane of the stud 362. It will be remembered that the key release shaft 57 rocks in a clockwise direction when the machine is released. This movement will cause the arm 370 to rock into the path of the stud 362 when the lever is standing in the add position. If the lever is standing in the read position when the machine is released, the bifurcated portion will engage the stud 362 and will thereby prevent moving the total lever to either the add or reset positions. If the lever is standing in the reset position when the machine is released, the arm 370 will be rocked in front of the stud 362, thereby preventing the lever from returning to either the read or reset positions.

Operation.

The mechanism herein disclosed forms an attachment for cash registers, and may be operated therewith or independently thereof. This attachment is used as a ledger number printer, and in the present embodiment a totalizer has been added thereto to afford a check for determining whether or not all of the ledger numbers have been properly set up in the printer. This device may also be used as an adding machine when used independently of the cash register.

The regular ledger number keyboard is provided, on which the operator sets up any number desired. During adding operations, the differential operates in the usual manner for adjusting an actuator. However, during the operation in which the amount is set up in the actuator, the amount is not added into the totalizer. This amount is added into the totalizer during the first part of the next succeeding cycle of operation, no matter whether that operation is an adding or total taking operation.

A total lever is provided for controlling certain mechanism for taking totals from the totalizer. In taking totals it is necessary to perform two cycles of operation, as is usual in cash registers. During the first part of the first cycle of a total taking operation, the amount which was set up during the last part of the previous operation is added into the totalizer. During the latter part of the first cycle of operation, the actuators are set to their "9" position. During the latter part of the first cycle of a total taking operation, a mechanism is operated which will position an arm into the path of the transfer trip arm, thereby rendering this arm unyieldable, and, during the first part of the second cycle, after the totalizer engages the actuator, the totalizer wheels are turned in their adding direction until they are stopped by the transfer trip arm. This will position the actuator commensurate with the amount which was standing on the totalizer wheels. The differential mechanism is so constructed that one of its members may move independently of the other, after the actuators and the differential member connected thereto have been stopped by the totalizer wheel; and during the latter part of the second cycle of operation the member which is moved independently will be moved to and stopped by a member which is secured to the actuator. The independently movable member has connected thereto the type carriers. Therefore the amount as determined by the totalizer will be set up by the actuator in this manner.

The transfer trip pawl is so positioned that the totalizer wheels will be stopped at "9" during total taking operations. A means for moving these wheels to zero after the total has been taken is provided. The means herein provided is the usual transfer mechanism, with an additional device which is similar to the transfer mechanism for adding one into the units wheel after the totalizer has been disengaged from the actuators. This device is tripped by the same arm which is used for locking the transfer trip arm during the first part of the second cycle of operation.

A means is also provided for controlling the totalizer whereby the amount which was taken from the totalizer may be again added thereon, or the totalizer wheels may be left standing at zero, as desired. When the operator positions the lever in the read position, then during the next succeeding operation of the machine, after a total taking operation, the totalizer will be engaged with the actuators during the first part of the operation, thereby re-entering the amount into the totalizer. If, however, the total lever is set to the reset position, then when the lever is moved back to the add position the totalizer engaging means is rendered ineffective so that the totalizer will not be engaged with the actuator during the first part of the next succeeding cycle of operation, after a total taking operation.

The totalizer is provided with wheels which have numbers engraved thereon, so that they may be visibly read. However, since the amount is added into the totalizer during the next succeeding operation, it is necessary to perform an idle operation, that is in an operation of the mechanism without any keys depressed. This will add the amount into the totalizer from the previous operation, and therefore show a correct total. A sight opening is provided for the convenient reading of the totalizer.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a totalizer element, an actuator therefor, a differentially movable member, a device connected to said actuator, means for coupling said device to said member whereby they both operate as a unit during adding operations for positioning said actuator, and means for uncoupling said device from said member during total taking operations whereby said device is moved under control of said totalizer element for determining the position to which said member is to be adjusted.

2. In a machine of the class described, the combination of a differentially movable member, a totalizer element, an actuator controlled by said member for adding amounts into said totalizer element, means on said totalizer element for controlling the positioning of the actuator during total taking operations, and means on said actuator for controlling the positioning of said member during total taking operations.

3. In a machine of the class described, the combination of a differentially movable member, a totalizer element, an actuator controlled by said member for adding amounts into said totalizer element, a transfer tooth on said totalizer element for controlling the positioning of the actuator during total taking operations, and a stop on said actuator for controlling the positioning of said member during total taking operations.

4. In a machine of the class described, the combination of a differentially movable member, a totalizer element, an actuator controlled by said member for adding amounts into said totalizer element, a transfer tooth on said totalizer element, a transfer pawl adapted to cooperate therewith for transferring from lower to higher order elements during adding operations, and means for locking said pawl against movement during total taking operations, thereby forming a positive stop for said totalizer element and actuator when said transfer tooth is moved to engage said pawl by said actuator.

5. In a machine of the class described, the combination of a differentially movable member, a totalizer element, an actuator controlled by said member for adding amounts into said totalizer element, a transfer tooth on said totalizer element, a transfer pawl adapted to cooperate therewith for transferring from lower to higher order elements during adding operations, means for locking said pawl against movement during total taking operations, thereby forming a positive stop for said totalizer element and actuator when said transfer tooth is moved to engage said pawl by said actuator, a flexible connection between said member and said actuator for permitting said member to move independently of said actuator during total taking operations, and a stop on said actuator for stopping said member in a position as determined by the totalizer element during total taking operations.

6. In a differential mechanism, the combination of a differentially movable member, and an actuator controlled by said member during adding operations, said actuator adapted to determine the position of said member during total taking operations.

7. In a differential mechanism, the combination of a differentially movable member, an actuator adapted to be positioned by said member during adding operations and adapted to be positioned independently of said member during total taking operations, and means on said actuator for determining the position to which said member is adjusted during total taking operations.

8. In a differential mechanism, the combination of a differentially movable member, an actuator adapted to be positioned by said member during adding operations and adapted to be positioned independently of said member during total taking operations, means on said actuator for determining the position to which said member is adjusted during total taking operations, and a means for locking said actuator in the position to which it is adjusted during total taking operations thereby forming unyielding means for determining the position to which said member is adjusted.

9. In a differential mechanism, the combination of a differentially movable member, an actuator adapted to be positioned by said member during adding operations and adapted to be positioned independently of said member during total taking operations, means on said actuator for determining the position to which said member is adjusted during total taking operations, and a device for rendering said means ineffective during adding operations.

10. In a differential mechanism, the combination of a differentially movable member, an actuator adapted to be positioned by said member during adding operations and adapted to be positioned independently of said member during total taking operations, means on said actuator for determining the position to which said member is adjusted during total taking operations, a device for rendering said means ineffective during adding operations, and an automatic means for controlling said device to permit it to become effective during total taking operations.

11. In a differential mechanism, the combination of a differentially movable member, and an actuator adapted to be moved positively by said member during adding operations and flexibly during total taking operations.

12. In a differential mechanism, the combination of a differentially movable member, an actuator adapted to be moved positively by said member during adding operations and flexibly during total taking operations, and a stop on said actuator for determining the position of said member during total taking operations.

13. In a differential mechanism, the combination of a differentially movable member, an actuator adapted to be moved positively by said member during adding operations and flexibly during total taking operations, a stop on said actuator for determining the position of said member during total taking operations, and a device for locking said actuator in the position to which it is adjusted during total taking operations thereby forming an unyielding stop for said member.

14. In a differential mechanism, the combination of a differentially movable member, a segment, an arm adapted to be moved by said member, a link for connecting said arm to said segment, a stud on said member for moving said arm in one direction, a pawl on said member for moving said arm in another direction during adding operations, and a flexible connection between said arm and said member for permitting said arm to be adjusted to a position independently of said member during total taking operations.

15. In a differential mechanism, the combination of a differentially movable member, a segment, an arm adapted to be moved by said member, a link for connecting said arm to said segment, a stud on said member for moving said arm in one direction, a pawl on said member for moving said arm in another direction during adding operations, a flexible connection between said arm and said member for permitting said arm to be adjusted to a position independently of said member during total taking operations, and a pawl on said arm for stopping said member in a position determined by said arm.

16. In a differential mechanism, the combination of a differentially movable member, a segment, an arm adapted to be moved by said member, a link for connecting said arm to said segment, a stud on said member for moving said arm in one direction, a pawl on said member for moving said arm in another direction during adding operations, a flexible connection between said arm and said member for permitting said arm to be adjusted to a position independently of said member during total taking operations, a pawl on said arm for stopping said member in a position determined by said arm, and a device for locking said arm in the position to which it is adjusted during total taking operations thereby forming an unyielding stop for said member.

17. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, and means for uncoupling said members during the second excursion of a total taking operation.

18. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said members during the second excursion of a total taking operation, and means secured to said totalizer element for controlling the extent of movement of said actuator and member connected thereto, during the second excursion.

19. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said member during the second excursion of a total taking operation, means secured to said totalizer element for controlling the extent of movement of said actuator and member connected thereto during the second excursion, and means on the last mentioned member for controlling the extent of movement of the other member of the differential mechanism during the second excursion.

20. In a machine of the class described, the combination of a totalizer element, an actuator therefor, differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said members during the second excursion of a total taking operation, means secured to said totalizer element for controlling the extent of movement of said actuator and member connected thereto, during the second excursion, means on the last mentioned member for controlling the extent of movement of the other member of the differential mechanism during the second excursion, and means for preventing said last mentioned means from becoming effective during the first excursion of said mechanism.

21. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said members during the second excursion of a total taking operation said last mentioned means being ineffective during adding operations, and a device for rendering said last mentioned means effective during total taking operations.

22. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said members during the second excursion of a total taking operation, said last mentioned means being ineffective during adding operations, a manipulative device adjustable for determining whether the machine will make an adding operation or a total taking operation, and a device carried by said manipulative device for rendering said last mentioned means effective during total taking operations.

23. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during first excursion, means for uncoupling said members during the second excursion of a total taking operation and a transfer tooth on said element adapted to control the extent of movement of said actuator and member connected thereto, during the second excursion.

24. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said members during the second excursion of a total taking operation, a transfer tooth on said element for carrying one to the higher order element when said element passes from nine to zero during adding operations, said transfer tooth adapted to control the extent of movement of said actuator and member connected thereto, during the second excursion, and a spring actuated pawl pivoted on the last mentioned member for controlling the extent of movement of the other member of the differential mechanism during the second excursion.

25. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion for uncoupling said members during the second excursion of a total taking operation, a transfer tooth on said element for carrying one to the higher order element when said element passes from nine to zero during adding operations, said transfer tooth adapted to control the extent of movement of said actuator and member connected thereto during the second excursion, a spring actuated pawl pivoted on the last mentioned member for controlling the extent of movement of the other member of the differential mechanism during the second excursion, and a lever for preventing said spring actuated pawl from becoming effective during the first excursion of said mechanism.

26. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion for uncoupling said members during the second excursion of a total taking operation, a transfer tooth on said element for carrying one to the higher order element when said element passes from nine to zero during adding operations, said transfer tooth adapted to control the extent of movement of said actuator and member connected thereto during the second excursion, a spring actuated pawl pivoted on the last mentioned member for controlling the extent of movement of the other member of the differential mechanism during the second excursion, a lever for preventing said spring actuated pawl from becoming effective during the first excursion of said mechanism, and a cam for operating said lever, said cam effective only during total taking operations.

27. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, means for uncoupling said members during the second excursion of a total taking operation, said last mentioned means ineffective during adding operations, a manually operable lever for determining whether the machine will make an adding or a total taking operation, and a pinion for rendering said means effective during total taking operations.

28. In a machine of the class described, the combination of a totalizer element, an actuator therefor, a differential mechanism comprising two members, a driver adapted to give said mechanism a complete excursion during an adding operation, means for connecting said actuator to one of said members, coupling means for coupling said members together during said excursion, said driver adapted to give said mechanism two excursions during a total taking operation, said coupling means being effective only during the first excursion, a lever for uncoupling said members during the second excursion of a total taking operation, said lever being ineffective during adding operation, a cam for operating said lever during the second excursion, a manually operable lever for determining whether the machine will make an adding or total taking operation, and a pinion carried by said manually operable lever for causing said cam to operate, during total taking operations.

29. In a machine of the class described, the combination of a plurality of manipulative devices, a differentially movable member, a driving means for said member, a latch on said member for latching the member to the driving means adapted to be unlatched under control of said manipulative devices during adding operations, a totalizer element, actuating means for said element coupled to said member and adapted to be positioned thereby during adding operations, means for uncoupling said means from said member during total taking operations, thereby permitting said actuating means to be positioned under control of said totalizer element, and a pawl on said actuating means adapted to unlatch said latch from the driving means after the actuating means has been positioned under control of said totalizer element.

30. In a machine of the class described, the combination of a plurality of manipulative devices, a differentially movable member, a driving means for said member, a latch on said member for latching the member to the driving means adapted to be unlatched under control of said manipulative devices during adding operations, a totalizer element, actuating means for said element coupled to said member and adapted to be positioned thereby during adding operations, means for uncoupling said means from said member during total taking operations, thereby permitting said actuating means to be positioned under control of said totalizer element, a pawl on said actuating means adapted to unlatch said total from the driving means after the actuating means has been positioned under control of said totalizer element, and a device for positively locking said actuating means after it has been adjusted thereby holding it in a fixed position for unlatching said latch.

31. The combination of a plurality of manipulative devices, a differentially movable member, a driving means for said member, a latch on said member for latching the member to the driving means adapted to be unlatched under control of said manipulative devices during adding operation, a totalizer element, actuating means for said element, an arm pivoted on said member for coupling the member with the actuating means during adding operations, a lever operable only during total taking operations for operating said arm for uncoupling said means from said member, and a pawl on said actuating means adapted to unlatch said latch from the driving means after the actuating means has been positioned under control of said totalizer element.

32. The combination of a plurality of manipulative devices, a differentially movable member, a driving means for said member, a latch on said member for latching the member to the driving means adapted to be unlatched under control of said manipulative devices during adding operation, a totalizer element, actuating means for said element, an arm pivoted on said member for coupling the member with the actuating means during adding operations, a lever operable only during total taking operations for operating said arm for uncoupling said means from said member, a pawl on said actuating means adapted to unlatch said latch from the driving means after the actuating means has been positioned under control of said totalizer element, and a device for positively locking said actuating means after it has been adjusted thereby holding it in a fixed position for unlatching said latch.

33. In a machine of the class described, the combination of a totalizer element, a differential mechanism for adding amounts therein, said mechanism comprising two members, means for adjusting one of said members whereby it will be adjusted under control of said element a distance equal to the complement of the amount on said element, and means for moving the other of said members whereby it will be moved until stopped by the first of said members, said last movement being commensurate with the amount originally on said element.

34. In a machine of the class described, the combination of a totalizer element, a differential mechanism for adding amounts therein, said mechanism comprising two members, a driving segment for adjusting said members, a projection on said element, a pawl cooperating with said projection for stopping said element and one of said members after said element has been moved a distance equal to the complement of the amount originally on said element, a latch on the other of said members for latching it to said driving segment, a resilient connection between said members whereby they may be operated together or independent of each other, and a stop on the first member for unlatching the said other member after the first member has been adjusted under control of the totalizer element.

35. In a machine of the class described, the combination of a totalizer, actuators therefor, a manipulative device for controlling the machine for performing adding reading and resetting operations, means for engaging said totalizer with the actuators during any of said operations, and means for rendering said engaging means ineffective at the beginning of any operation succeeding a resetting operation.

36. In a machine of the class described, the combination of a totalizer, actuators therefor, a manipulative device for controlling the machine for performing adding reading and resetting operations, an arm operated during every operation of the machine for engaging said totalizer with said actuators, a pivoted pawl carried by said arm for connecting said arm to the totalizer, and a means carried by the manipulative device for disengaging said pawl from the totalizer when said manipulative device is moved succeeding a resetting operation.

37. In a machine of the class described, the combination of a totalizer, actuators therefor, a plurality of manipulative devices, said actuator being adapted to be adjusted under control of said devices or under control of said totalizer during the latter part of an operation of the machine, a manipulative device for controlling the machine for performing adding, reading and resetting operations, means for engaging said totalizer with the actuators during the first part of any operation for entering the amounts from the actuators into the totalizer set thereon during the preceding operation, and means for rendering said engaging means ineffective at the beginning of any operation succeeding a resetting operation.

38. In a machine of the class described, the combination of a totalizer, actuators therefor, a plurality of manipulative devices, said actuator being adapted to be adjusted under control of said devices or under control of said totalizer during the latter part of an operation of the machine, an arm operated during every operation of the machine for engaging said totalizer with said actuators, a pivoted pawl carried by said arm for connecting said arm to the totalizer, and a means carried by said manipulative device for disengaging said pawl from the totalizer when said manipulative device is moved after a resetting operation, thereby preventing said totalizer from engaging the actuators during the first part of the succeeding operation.

39. In a machine of the class described, the combination of a plurality of totalizer elements, actuators for entering items thereon, transfer devices, means for controlling said actuators for causing them to be turned in an adding direction for turning said totalizer element to "9" during read or reset operations, thereby causing the actuators to be set to a position commensurate with the amount previously on said elements, means for automatically causing "1" to be added into the units wheel thereby causing all of said elements to be turned to zero during either read or reset operations, and means for controlling the engagement of the totalizer during the next succeeding operation whereby the amount set on the actuators is added back into the totalizer if the preceding operation was a read operation and to prevent such engagement if the preceding operation was a reset operation.

40. In a machine of the class described, the combination of a main cam shaft, a release shaft, another cam shaft, means for clutching the two shafts together, said clutch being so constructed that upon operation of the main shaft the second mentioned shaft will be operated therewith, but for permitting operation of the second mentioned shaft independent of the main shaft, means controlled by the release shaft for preventing operation of the second mentioned shaft independent of the main shaft after the release shaft has been operated, and means for preventing operation of the release shaft after the second mentioned shaft has started to operate.

In testimony whereof I affix my signature.

WILLIAM H. ROBERTSON.